No. 867,128. PATENTED SEPT. 24, 1907.
C. H. HARRIS.
COPY HOLDER.
APPLICATION FILED APR. 2, 1906.
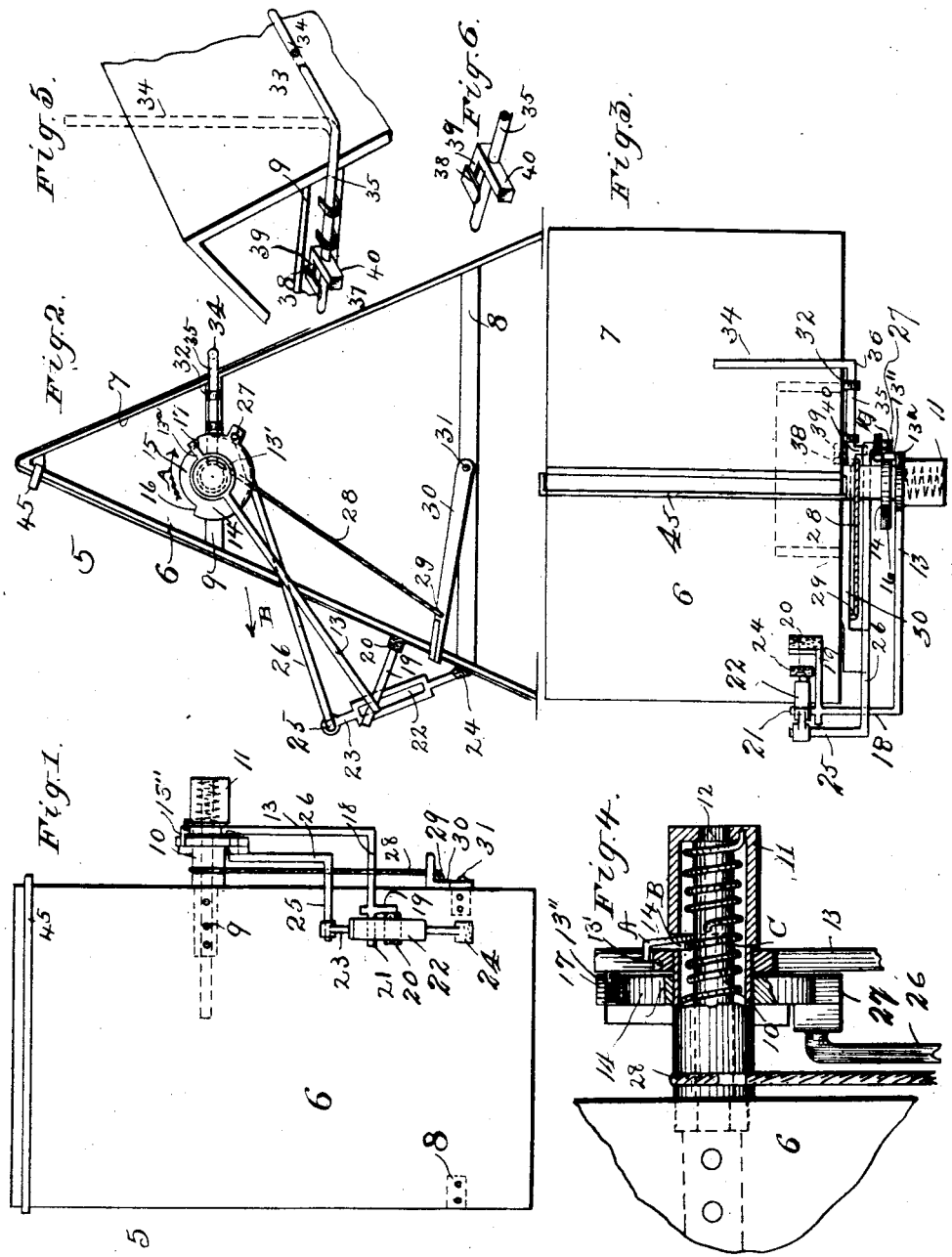
Witnesses
W. Rees Edelen.
B. G. Gardner.
Inventor
Charles H. Harris
by Shepherd & Parker
Attorneys

UNITED STATES PATENT OFFICE.

CHARLES H. HARRIS, OF SAYRE, OKLAHOMA TERRITORY.

COPY-HOLDER.

No. 867,128.        Specification of Letters Patent.        Patented Sept. 24, 1907.

Application filed April 2, 1906. Serial No. 309,530.

*To all whom it may concern:*

Be it known that I, CHARLES H. HARRIS, a citizen of the United States, residing at Sayre, in the county of Roger Mills and Territory of Oklahoma, have invented certain new and useful Improvements in Copy-Holders, of which the following is a specification.

My invention relates to copy-holders and has for its object the provision of a device of this character provided with mechanism for turning the leaves of a stenographer's note book by pressure upon a finger key.

Further objects and advantages of the invention will be set forth in the detailed description which now follows:

In the accompanying drawing, Figure 1 is a front elevation of a copy-holder constructed in accordance with the invention, Fig. 2 is a side elevation of said copy-holder, Fig. 3 is a plan view thereof, Fig. 4 is a detail sectional view of a portion of a leaf operating mechanism hereinafter described, Fig. 5 is a detail perspective view of a clamping bar hereinafter described, and, Fig. 6 is a detail view of the inner end of said clamping bar.

Like numerals designate corresponding parts in all the figures of the drawing.

Referring to the drawing, the numeral 5 designates an A-shaped frame comprising the members 6 and 7. Tie rods 8 extend transversely across the frame beneath these members 6 and 7 and impart additional rigidity to the structure. A bar 9 extends beneath the members 6 and 7 and serves to support a short shaft 10. Mounted upon this shaft, is a casing 11 to which motion is imparted in one direction by a coiled spring 12, one end of which is secured to the shaft 10 and the other end of which engages the wall of said casing. A bar 13 is provided with an enlarged portion 13' which encircles the casing 11 and forms a journal for said arm. Mounted to turn with the casing 11 is a disk 14 having a portion of its periphery cut away, as at 15, to form shoulders 16 and 17. The outer end of the bar 13 is bent at right angles, as at 18, and is provided with an inwardly extending arm 19 which carries a leaf engaging shoe 20, preferably formed of soft rubber. The extreme inner end of the portion 18 extends past the inwardly extending arm 19, as at 21, and passes through the slotted guide 22 of the downwardly extending arm 23, upon the lower end of which is mounted a leaf engaging shoe 24, also preferably formed of soft rubber. The upper end of the arm 23 is pivoted upon an inward extension 25 of a bar 26, the opposite end of said bar 26 being pivoted to an extension 27 of disk 14. A cord or other flexible cable 28 passes partly around the casing 11 and is secured thereto, the lower end of said cord being secured, as at 29, to a finger lever 30, which is pivoted at 31 upon one of the transverse tie rods 8. Pivoted in keepers 32, secured to the bar 9, is an L-shaped lever 33, comprising an arm 34 which overlies the portion 7 of the A-shaped frame 5 and an arm 35 which lies parallel to the bar 9. The inner end of the arm 35 is provided with a flat outstanding lug 38 designed to be engaged by an angular extension 39 carried upon a laterally extending finger 40 which is loosely mounted upon the arm 35. A bar 45 spans the upper portion of the A-shaped frame and is adapted to receive and support a stenographer's notebook in such a manner that the leaves of said notebook lie along the member 6 of the frame 5, said leaves resting beneath the shoes 20 and 24. The casing 11 is formed with a peripheral slot B through which the free end A of a spring C extends to engage the bar 13, with sufficient strength to prevent the movement of said bar except when positively engaged by an operating element provided therefor.

The operation of the device is as follows: When it is desired to turn one of the leaves of the notebook in such a manner as to bring the successive leaf into view, the finger lever 30 is depressed. This turns the sleeve 11 against the tension of the spring 12 upon the shaft 10 and imparts movement in the direction of the arrow A in Fig. 2 to the disk 14. The initial movement of the disk 14 forces rod 26 in the direction of the arrow B in Fig. 2, but does not affect rod 13. This rocks the arm 23 upon the extension 21 of the arm 13 and causes the shoe 24 to move toward the shoe 20. Shoe 24 picks up a portion of the leaf and as the movement of the bar 26 continues clamps said leaf against the shoe 20. At this moment the shoulder 16 of disk 14 contacts with the pin 13″ secured to the extension 13ᵃ of arm 13 as shown in Fig. 3 and imparts bodily movement to said rod. Both the rods 26 and 13 are then carried around bodily by the disk 14 until the leaf begins to approach the member 7 of the frame 5 at which time the end of bar 26 engages the finger 40 and imparts downward movement to the end of said finger which through the agency of the extension 39 in its positive engagement with the lug 38 rocks the arm 35 of lever 33 and lifts the arm 34 of said lever to an almost vertical position to permit the passage of the leaf thereby. Immediately after this operation the bar 26 passes the finger 40 which together with the lever 45 returns by gravity to initial position. When the finger lever 30 is released spring 12 acts to return the parts to their original position, the engagement of arm 34 with the leaf serving to draw said leaf from between the shoes 20 and 24 after which said shoes return to the position illustrated in Fig. 1 preparatory to again repeating the operation.

From the foregoing it will be seen that simple and efficient means have been provided for accomplishing the objects of the invention, but while the elements herein shown and described are well adapted to serve the purpose for which they are intended, it is to be understood that my invention is not limited to the precise construction set forth, but includes within its purview such changes as may be made within the scope of the appended claims.

Having described my invention, what I claim, is:

1. In a device of the character described, the combination with a frame of a sleeve, manually operable means for actuating said sleeve in one direction, a spring for actuating said sleeve in the opposite direction, gripping members and means actuated by said sleeve for imparting an initial movement to one of said gripping members ahead of the other of said gripping members and to then cause both of said gripping members to move together.

2. In a device of the character described, the combination with an A-shaped frame of gripping members, means for actuating said gripping members in such manner as to cause them to engage a sheet, means for swinging said gripping members from one side of said A-shaped frame to the other side of said frame, means for clamping the sheet after it has been swung and means for automatically returning the parts to their former position.

3. In a device of the character described, the combination with an A-shaped frame of a sleeve, a finger lever, connections between said sleeve and said finger lever adapted to actuate said sleeve in one direction when said lever is actuated, a spring for actuating said sleeve in the opposite direction, a pair of gripping members, connections between said gripping members and said sleeve adapted to impart initial movement to one of said gripping members ahead of the other of said gripping members, means for then causing both of said gripping members to move together to swing a sheet from one side of the A-shaped frame to the other side and means for gripping said sheet after it has been thus swung.

In testimony whereof I affix my signature in presence of two witnesses.

CHARLES H. HARRIS.

Witnesses:
L. M. PEATT,
G. B. GOODE.